United States Patent
Haverlah

(10) Patent No.: US 10,235,675 B1
(45) Date of Patent: Mar. 19, 2019

(54) VEHICLE IDENTIFIER COMMUNICATION AND AUTHENTICATION

(71) Applicant: United Services Automobile Association (USAA), San Antonio, TX (US)

(72) Inventor: Sharon Kay Haverlah, Bulverde, TX (US)

(73) Assignee: United Services Automobile Assocation (USAA), San Antonio, TX (US)

(*) Notice: Subject to any disclaimer, the term of this patent is extended or adjusted under 35 U.S.C. 154(b) by 322 days.

(21) Appl. No.: 15/175,795

(22) Filed: Jun. 7, 2016

Related U.S. Application Data

(60) Provisional application No. 62/193,411, filed on Jul. 16, 2015.

(51) Int. Cl.
  *G06Q 20/32* (2012.01)
  *G06Q 20/40* (2012.01)
  *H04L 29/08* (2006.01)
  *H04L 29/06* (2006.01)
  *G06Q 20/38* (2012.01)

(52) U.S. Cl.
  CPC ....... *G06Q 20/405* (2013.01); *G06Q 20/3226* (2013.01); *G06Q 20/382* (2013.01); *H04L 63/0876* (2013.01); *H04L 67/12* (2013.01)

(58) Field of Classification Search
  CPC .................................................. G06Q 20/3226
  USPC .......................................................... 705/44
  See application file for complete search history.

(56) References Cited

U.S. PATENT DOCUMENTS

| | | | | |
|---|---|---|---|---|
| 2010/0109835 | A1* | 5/2010 | Alrabady | H04L 63/0823 340/5.2 |
| 2013/0329888 | A1* | 12/2013 | Alrabady | G06Q 20/3224 380/270 |
| 2015/0187351 | A1* | 7/2015 | Moon | G10L 15/22 704/231 |
| 2015/0220916 | A1* | 8/2015 | Prakash | G06Q 20/36 705/41 |
| 2016/0012403 | A1* | 1/2016 | Kursun | G06Q 20/1085 705/44 |
| 2017/0371608 | A1* | 12/2017 | Wasserman | G06F 3/14 |
| 2018/0009446 | A1* | 1/2018 | Ricci | B60W 50/08 |
| 2018/0130044 | A1* | 5/2018 | Gage | G06Q 20/3224 |

* cited by examiner

*Primary Examiner* — Lindsay M Maguire
(74) *Attorney, Agent, or Firm* — Fish & Richardson P.C.

(57) ABSTRACT

Methods, systems, and apparatus, including computer programs encoded on a computer storage medium, for receiving a vehicle identifier (VID), the VID uniquely identifying a vehicle of a user, receiving a response that indicates the user and that provides user information associated with the user, the user information including one or more of behavioral information and disbursement information, and at least partially performing an operation based on the user information.

20 Claims, 2 Drawing Sheets

VEHICLE IDENTIFIER COMMUNICATION AND AUTHENTICATION

CROSS-REFERENCE TO RELATED APPLICATION

This application claims the benefit of the filing date of U.S. Application No. 62/193,411, filed on Jul. 16, 2015, the contents of which is incorporated herein by reference in its entirety.

BACKGROUND

People conduct repetitive activities based on daily routines. For example, a person visiting a fast food restaurant may often order the same order each visit. As another example, a person visiting a fueling station may often refuel their vehicle with the same type of fuel. Some activities people perform require authentication, which is implemented to ensure that a person is who they purport to be. For example, a user can attempt to access an automated teller machine (AMT) to retrieve cash. In some examples, authentication can be achieved based on a plurality of authentication factors (e.g., card, device, user credentials).

SUMMARY

Implementations of the present disclosure are generally directed to transactions that are based on vehicle recognition. More particularly, implementations of the present disclosure are directed to tying a vehicle to a user and data associated with the user to enable transactions to be performed based on vehicle recognition and information retrieval in response to the vehicle recognition.

In general, innovative aspects of the subject matter described in this specification can be embodied in methods that include actions of receiving a vehicle identifier (VID), the VID uniquely identifying a vehicle of a user, receiving a response that indicates the user and that provides user information associated with the user, the user information including one or more of behavioral information and disbursement information, and at least partially performing an operation based on the user information. Other implementations of this aspect include corresponding systems, apparatus, and computer programs, configured to perform the actions of the methods, encoded on computer storage devices.

These and other implementations can each optionally include one or more of the following features: actions further include transmitting a request to a vehicle recognition based transaction (VRT) system, the request including the VID and context information, the response being provided from the VRT system based on the request; the context information includes one or more of date, time, location, and transaction type; the one or more of behavioral information and disbursement information are provided based on the context information; the transaction includes authentication of the user, the user being at least partially authenticated based on the VID; the transaction includes one of purchasing goods, purchasing services, and withdrawing money; actions further include providing a suggested order to the user based on the behavioral data; actions further include providing a suggested disbursement method to the user based on the behavioral data; and actions further include transmitting transaction data, the transaction data including behavioral information and disbursement information that is specific to the transaction.

These and other implementations can provide one or more advantages. In some examples, implementations of the present disclosure enable pre-staged transactions, expediting orders for service, increasing authentication factors on transactions, increasing user experience satisfaction, and reducing error handling. Another example advantage also includes protection of disbursement details (e.g., payment details are automatically provided, so user does not have to input payment details at time of transaction). Implementations of the present disclosure also enhance data collection capabilities. For example, collecting information on cash-based transactions is difficult. Implementations of the present disclosure enable efficient data collection on cash-based transactions and can tie such transactions to particular users.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to transactions that are based on vehicle recognition. Such transactions are referred to herein as vehicle-recognition based transactions (VRTs). More particularly, implementations of the present disclosure are directed to associating a vehicle to a user to enable transactions to be performed based on vehicle recognition and information retrieval in response to the vehicle recognition. In some implementations, a vehicle is associated with a unique identifier (VID) that is also associated with one or more users. In some implementations, the VID is associated with information of a user. Example information includes, without limitation, behavioral information and disbursement (e.g., payment) information. In accordance with implementations of the present disclosure, a VRT can be performed, during which a VID of a vehicle is determined, a user associated with the VID is determined, information associated with the user is retrieved, and the transaction is conducted based on the information. Example transactions can include, without limitation, withdrawing money from an automated teller machine (ATM), depositing a check at a bank, purchasing fuel for the vehicle, ordering food from a restaurant, and purchasing services for the vehicle. In some examples, the VID is used as one of multiple authentication factors to authenticate the user. In some examples, the information is used to determine one or more products and/or services to be provided to the user. In some examples, the information is used to purchase the one or more products and/or services.

Implementations of the present disclosure will be described in further detail with reference to example use cases. The example use cases include ordering food from a restaurant, retrieving cash from an ATM, and purchasing fuel for a vehicle. It is contemplated, however, that implementations of the present disclosure can be used in any appropriate use case.

Figure 1:
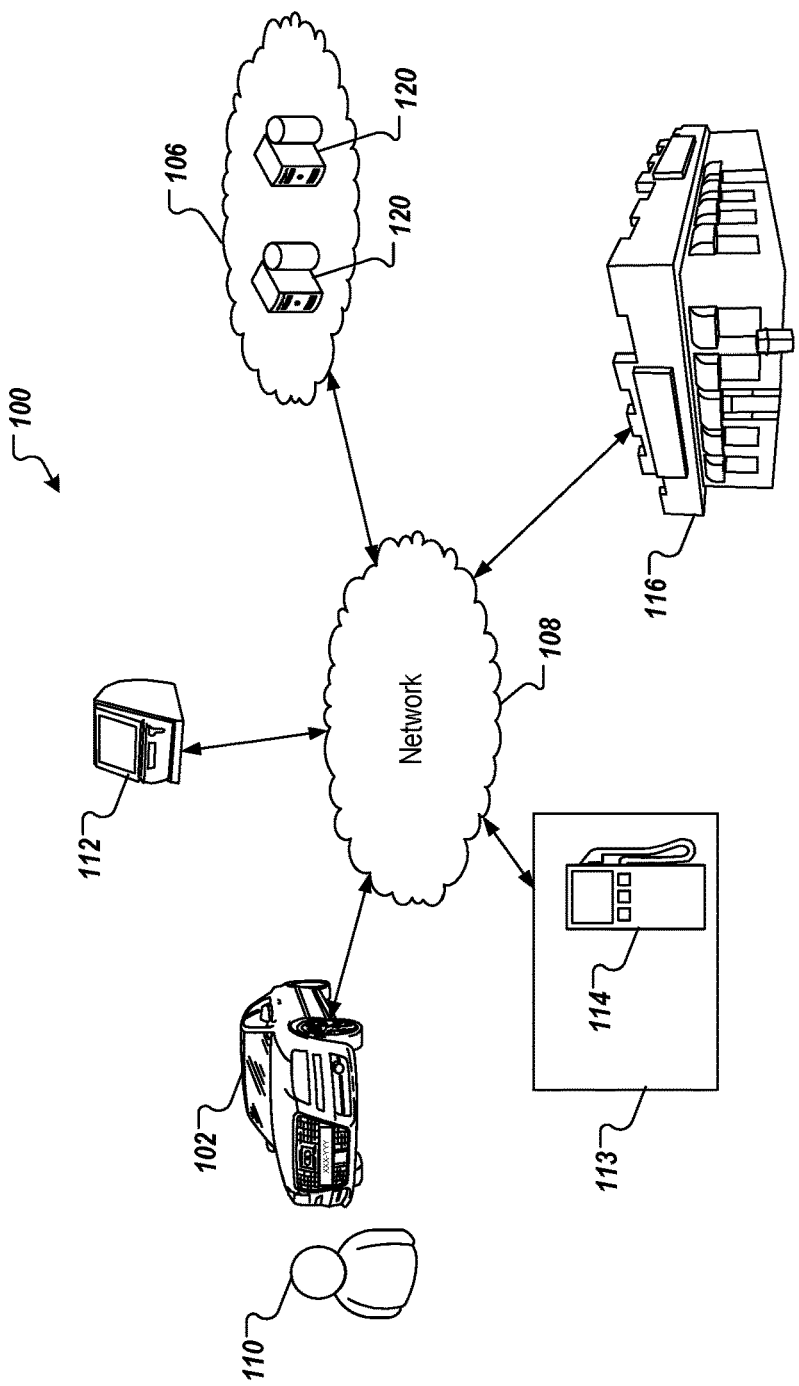
FIG. 1 depicts an example environment in accordance with implementations of the present disclosure.

FIG. 1 depicts an example environment 100, in which implementations of the present disclosure can be provided. In some examples, the example environment 100 enables VRTs to be conducted. The example environment 100 includes a vehicle 102, a back-end system 106, and a network 108. In some examples, the vehicle 102 is driven by a user 110. The example environment 100 also includes an ATM 112, a fuel station 113 having a fuel pump 114, and a restaurant 116 (e.g., fast food restaurant).

In some implementations, the vehicle 102 is an Internet-connected vehicle that is able to communicate with computing devices (e.g., the back-end system 106) over the network 108. For example, the vehicle 102 includes computing and networking hardware and software that enables communication over the network 108. In some examples, the network 108 includes a local area network (LAN), wide area network (WAN), the Internet, or a combination thereof, and connects web sites, user devices (e.g., the computing device 102), and the back-end systems (e.g., back-end system 106). In some examples, the network 108 can be accessed over a wired and/or a wireless communications link. For example, mobile computing devices, such as smartphones can utilize a cellular network to access the network 108.

In the depicted example, the back-end system 106 includes at least one server system 120. In some examples, the at least one server system 120 hosts one or more computer-implemented services that users can interact with using computing devices. For example, the vehicle 102 can include one or more computing devices therein, which can be used to communicate with a service hosted by the back-end system 106 over the network 108. As another example, the ATM 112 can include one or more computing devices therein, which can be used to communicate with a service hosted by the back-end system 106 over the network 108. As another example, the fuel station 113 and/or the fuel pump 114 can include one or more computing devices therein, which can be used to communicate with a service hosted by the back-end system 106 over the network 108. As another example, the restaurant 116 can include one or more computing devices therein, which can be used to communicate with a service hosted by the back-end system 106 over the network 108.

Implementations of the present disclosure are generally directed to VRTs. More particularly, implementations of the present disclosure are directed to associating a vehicle to a user to enable transactions to be performed based on vehicle recognition and information retrieval in response to the vehicle recognition. In accordance with implementations of the present disclosure, a VRT can be performed, during which a VID of a vehicle is determined, a user associated with the VID is determined, information associated with the user is retrieved, and the transaction is conducted based on the information. Example transactions can include, without limitation, withdrawing money from an ATM, depositing a check at a bank, purchasing fuel for the vehicle, ordering food from a restaurant, and purchasing services for the vehicle.

In some implementations, a vehicle (e.g., the vehicle 102 of FIG. 1) is associated with a VID. In some examples, the VID uniquely identifies the vehicle. Example VIDs can include, without limitation, a vehicle identification number (VIN), a license plate number (LPN), or any other appropriate VID assigned to the vehicle. In some examples, the VID can include a mobile subscriber integrated services digital network-number (MSISDN), a subscriber identity module (SIM), and/or a mobile equipment identity (MEI/IMEI)). In some implementations, a vehicle can include two or more VIDs. For example, the vehicle can include two or more of a VIN, a LPN and an IMEI.

In accordance with implementations of the present disclosure, a VRT system can associate a vehicle with one or more users. In some examples, the VRT system is hosted by a back-end system (e.g., the back-end system 106 of FIG. 1). In some implementations, the VID is associated with information of a respective user. Example information includes, without limitation, behavioral information and disbursement information. In some examples, the VRT system can provide a profile for the user. In some examples, the profile includes the one or more VIDs associated with the user and information associated with the user.

In some examples, disbursement information includes data associated with one or more of a savings account, a checking account, and a credit card account for the user, through which the user can purchase products and/or services as part of a transaction. For example, the disbursement information can be used by a merchant to charge the user for products and/or services in a VRT. In some examples, disbursement information includes cash. That is, for example, the user may have used cash in one or more VRTs. In some examples, the disbursement information captures instances, in which the user paid cash. In this manner, cash-based transactions can be more granularly recorded.

In some examples, behavioral information includes data associated with one or more types of transactions indicating, for example, user preferences for a transaction. Example types of transactions can include product purchase transactions and service purchase transactions. For example, for a food product purchase at a particular fast food retailer, the behavioral information can indicate that the user periodically purchases the same order on weekday evenings. For example, at a fictitious fast food retailer "Castle Black," the behavioral information indicates that the user periodically purchases an adult meal and two children's meals on weekday evenings, and pays for the meals using a credit card. As another example, for a fuel purchase at a particular fueling station, the behavioral information can indicate that the user regularly purchases unleaded, mid-grade fuel for the particular vehicle, always rejects requests for a car wash, and pays for the fuel using a credit card.

In some implementations, the VRT system can be provided by a service provider. An example service provider can be an entity that provides one or more services to a user of the vehicle. An example entity can include a financial institution (e.g., a bank) that provides the one or more of a savings account, a checking account, and a credit card account for the user. For example, the financial institution can associate the VID with an already established user profile of the user. Accordingly, the entity (e.g., financial institution) can maintain a database that associates users with respective disbursement information and behavioral information.

In some implementations, the entity can offer the VRT system to users and retailers. For example, the entity can offer the VRT system as a service to its customers (users), who can opt-into using the VRT system for VRTs (e.g., agreeing to use of disbursement information and/or behavioral information). As another example, a retailer can subscribe to the VRT system and can receive behavioral information and/or disbursement information during performance of a VRT, as described in further detail herein.

For example, a retailer can subscribe to the VRT system and can receive behavioral information and/or disbursement information during performance of a VRT for any users that have opted-into using the VRT system.

Another example, the service provider can be a third-party service provider (TSP). In some examples, an entity (e.g., financial institution) can subscribe to the VRT system and can provide behavioral information and/or disbursement information during performance of a VRT (e.g., for any users that have opted-into using the VRT system). In some examples, a retailer can subscribe to the VRT system and can receive behavioral information and/or disbursement information during performance of a VRT. In some examples, an entity can provide behavioral information and/or disbursement information to the TSP, which provides the behavioral information and/or disbursement information to the retailer. In some examples, the TSP facilitates communication between the entity and the retailer, but does not directly receive the behavioral information and/or disbursement information. For example, at the outset of a VRT, the TSP can provide respective endpoint information (e.g., Internet Protocol (IP) addresses) to the entity and the retailer, and the entity and/or the retailer can establish a communication session there between (e.g., secure session) based on the endpoint information. In this manner, potentially sensitive information (e.g., payment information) is not shared with the TSP.

Implementations of the present disclosure will be described in detail with reference to example use cases of ordering food from a restaurant and purchasing fuel for a vehicle. With reference to ordering food from a restaurant, a user can drive to the restaurant in a vehicle. Upon entering a fast food order lane ("drive-thru"), for example, equipment at the restaurant can scan the vehicle to determine the VID of the vehicle. For example, the equipment can include a camera that can provide a digital image of the vehicle, the image can be processed using optical character recognition (OCR) to determine the VID (e.g., LPN, VIN). As another example, the equipment can include a RFID reader that can scan the vehicle and receive a RFID signal (e.g., from an RFID tag of the vehicle), which can be decoded to provide the VID. As another example, the equipment can include a receiver that receives a signal periodically transmitted from a transponder of the vehicle, the signal being decoded to provide the VID.

In some examples, a computing device at the restaurant can transmit a request for behavioral information and/or disbursement information. In some examples, the request includes the VID. In some examples, the request includes context information. Example context information can include, without limitation, date, time, location, transaction type (e.g., food purchase). The computing device can transmit the request to at least one entity (e.g., financial institution) that provides a VRT system. As another example, the computing device can transmit the request to a TSP that provides a VRT system. In some examples, the computing device receives a response (e.g., from an entity or a TSP). In some examples, the response can indicate that there are no users associated with the VID. Consequently, a VRT cannot be performed and the ordering and purchasing of food is executed in a traditional workflow (e.g., user relays order to personnel at the restaurant, restaurant prepares order, user pays at drive-thru window). In some examples, the response can indicate that a user is associated with the VID, but there is no behavioral data and/or purchase data associated with the user. Consequently, a VRT cannot be performed and the ordering and purchasing of food is executed in a modified-traditional workflow. In some examples, the modified-traditional workflow includes the traditional workflow (e.g., user relays order to personnel at the restaurant, restaurant prepares order, user pays at drive-thru window), as well as the computing device providing transaction data to the VRT system (e.g., upon completion of the transaction). For example, after the user has paid and has received the food, transaction data can be transmitted to VRT system. In some examples, the transaction data includes behavioral data and/or disbursement data. For example, the transaction data can include time, date, transaction type (e.g., food), contents of the order, and disbursement data (e.g., cash, credit, debit). In this manner, the transaction data can be recorded by the VRT system for use in subsequent VRTs.

In some examples, the response can indicate that a user is associated with the VID and that there is behavioral data associated with the user, but there is no purchase data associated with the user. Consequently, a first limited VRT can be performed. In some examples, the first limited VRT includes processing the behavioral data to determine a suggested order, providing the suggested order to the user, receiving an order from the user, restaurant prepares order, and the user pays at drive-thru window. In some examples, the behavioral data can indicate one or more items of food that the user is likely to order based on the context data provided with the request. For example, if the context data indicates a weekday evening, the behavioral data can indicate an adult meal and two children's meals are typically ordered. Consequently, the suggested order can include an adult meal and two children's meals. In some examples, the suggested order is displayed on a screen to the user. For example, the user pulls up to the drive-thru and a screen displays the suggested order providing the example text "Hello Ms. Smith, would you like an adult meal and two children's meals this evening?" In some examples, the suggested order can be audibly conveyed to the user. For example, an employee at the restaurant, or a computer-synthesized voice can audibly convey the example message "Hello Ms. Smith, would you like an adult meal and two children's meals this evening?"

As part of the first limited VRT, the order is received from the user. In some examples, the user can confirm the suggested order. Consequently, the suggested order is the order received from the user. In some examples, the user can modify the suggested order (e.g., add items, remove items). In some examples, the user can delete the suggested order, and begin the order new.

As part of the first limited VRT, the computing device of the restaurant can provide transaction data to the VRT system (e.g., upon completion of the transaction). For example, after the user has paid and has received the food, transaction data can be transmitted to VRT system. In some examples, the transaction data includes behavioral data and/or disbursement data. For example, the transaction data can include time, date, transaction type (e.g., food), contents of the order, and disbursement data (e.g., cash, credit, debit). In this manner, the transaction data can be recorded by the VRT system for use in subsequent VRTs.

In some examples, the response can indicate that a user is associated with the VID and that there is disbursement data associated with the user, but there is no behavioral data associated with the user. Consequently, a second limited VRT can be performed. In some examples, the second limited VRT includes receiving an order from the user, providing at least one suggested payment option to the user based on the disbursement data, and receiving payment from the user. In some examples, the disbursement data can indicate one or more methods of payment that the user can use based on the disbursement data, and the suggested payment option can be provided based thereon. For example, if the disbursement data indicates a credit card account, the suggested payment option can include the credit card account. For example, the user pulls up to the drive-thru, places an order, and the total cost of the order and the suggested payment option are conveyed to the user (e.g., on a display screen, audibly). In some examples, the user can confirm the suggested payment option. Consequently, the suggested payment option is executed to pay for the order. In some examples, because the disbursement data is provided, payment can be tendered automatically without requiring further input from the user. For example, the user's credit card can be charged without the user having to actually tender the credit card. In some examples, the user declines the suggested payment option and pays using another method (e.g., paying in cash).

As part of the second limited VRT, the computing device of the restaurant can provide transaction data to the VRT system (e.g., upon completion of the transaction). For example, after the user has paid and has received the food, transaction data can be transmitted to VRT system. In some examples, the transaction data includes behavioral data and/or disbursement data. For example, the transaction data can include time, date, transaction type (e.g., food), contents of the order, and disbursement data (e.g., cash, credit, debit). In this manner, the transaction data can be recorded by the VRT system for use in subsequent VRTs.

In some examples, the response can indicate that a user is associated with the VID and that there is both behavioral data and disbursement data associated with the user. Consequently, a full VRT can be performed. In some examples, the full VRT is a combination of the first and second limited VRTs. That is, the behavioral data is used to provide a suggested order to the user, and the disbursement data is used to provide a suggested payment option to the user. As part of the full VRT, the computing device of the restaurant can provide transaction data to the VRT system (e.g., upon completion of the transaction). For example, after the user has paid and has received the food, transaction data can be transmitted to VRT system. In some examples, the transaction data includes behavioral data and/or disbursement data. For example, the transaction data can include time, date, transaction type (e.g., food), contents of the order, and disbursement data (e.g., cash, credit, debit). In this manner, the transaction data can be recorded by the VRT system for use in subsequent VRTs.

Continuing with the example food ordering use case, implementations of the present disclosure enable food to be pre-ordered, before the vehicle arrives at the restaurant. In some examples, a location of the vehicle can be determined based on geo-location data. For example, the VRT system can periodically receive geo-location information of a vehicle as the vehicle is traveling. In some examples, one or more potential destinations of the vehicle can be determined based on behavioral information associated with the VID of the vehicle. For example, the behavioral information associated with the VID can indicate that the vehicle (and thus, the user) periodically drives to and orders food from the fictitious restaurant "Castle Black," on weekdays. In some examples, it can be determined that the geo-location data indicates that the vehicle is traveling in a direction that would result in the vehicle passing the restaurant. In response, the vehicle can provide a notification to the user to order food from the restaurant, and can provide a suggested order (e.g., based on the behavioral information, as discussed above). For example, a display in the vehicle can display the message "Castle Black on Westoros Blvd., order an adult meal and two children's meals?" with example user-selectable icons of "Yes," and "No." In some examples, the notification can be audibly conveyed to the user (e.g., a synthesized voice asking the user "Would you like to order an adult meal and two children's meals from Castle Black on Westoros Blvd.?" In some examples, the user can provide a response (e.g., say yes/no, select yes/no icon).

In some implementations, if the user accepts the suggested order (e.g., says yes, selects yes icon), the order, VID, and disbursement information are provided to the restaurant. For example, the VRT system transmits an order request to the restaurant (e.g., over a network), the request including the order, VID, and disbursement information. In some examples, when the vehicle arrives at the restaurant, equipment at the restaurant can be used to determine the VID, as described herein. In some examples, the user can drive into the drive-thru and can receive their order without having to order, wait for the food to be prepared, and pay for the order. That is, the user can simply pick-up the order and drive off.

With reference to purchasing fuel from a fueling station, a user can drive to the fueling station in a vehicle. Upon pulling up to a fuel pump, for example, equipment at the fueling station can scan the vehicle to determine the VID of the vehicle. For example, the equipment can include a camera that can provide a digital image of the vehicle, the image can be processed using OCR to determine the VID (e.g., LPN, VIN). As another example, the equipment can include a RFID reader that can scan the vehicle and receive a RFID signal (e.g., from an RFID tag of the vehicle), which can be decoded to provide the VID. As another example, the equipment can include a receiver that receives a signal periodically transmitted from a transponder of the vehicle, the signal being decoded to provide the VID.

In some examples, a computing device at the fueling station can transmit a request for behavioral information and/or disbursement information. In some examples, the request includes the VID. In some examples, the request includes context information. Example context information can include, without limitation, date, time, location, transaction type (e.g., fuel purchase). The computing device can transmit the request to at least one entity (e.g., financial institution) that provides a VRT system. As another example, the computing device can transmit the request to a TSP that provides a VRT system. In some examples, the computing device receives a response (e.g., from an entity or a TSP). In some examples, the response can indicate that there are no users associated with the VID. Consequently, a VRT cannot be performed and the purchase of fuel is executed in a traditional workflow (e.g., user selects fuel type, fuels vehicle, tenders payment). In some examples, the response can indicate that a user is associated with the VID, but there is no behavioral data and/or purchase data associated with the user. Consequently, a VRT cannot be performed and the purchasing of fuel is executed in a modified-traditional workflow. In some examples, the modified-traditional workflow includes the traditional workflow (e.g., user selects fuel type, fuels vehicle, tenders payment), as well as the computing device providing transaction data to the VRT system (e.g., upon completion of the transaction). For example, after the user has paid for the fuel, transaction data can be transmitted to the VRT system. In some examples, the transaction data includes behavioral data and/or disbursement data. For example, the transaction data can include time, date, transaction type (e.g., fuel), grade of fuel, whether the user purchased ancillary products and/or services (e.g., car wash, food), and disbursement data (e.g., cash, credit, debit). In this manner, the transaction data can be recorded by the VRT system for use in subsequent VRTs.

In some examples, the response can indicate that a user is associated with the VID and that there is behavioral data associated with the user, but there is no purchase data associated with the user. Consequently, a first limited VRT can be performed. In some examples, the first limited VRT includes processing the behavioral data to determine a suggested fuel grade, any suggested ancillary products and/or services, providing the suggested fuel grade to the user, providing any suggested ancillary products and/or services to the user, receiving confirmation from the user, user fuels the vehicle, and the user pays (e.g., at pump or cashier). In some examples, the behavioral data can indicate a grade of fuel that the user is likely to select. In some examples, the suggested fuel grade and any suggested ancillary products and/or services are displayed on a screen to the user. For example, the user pulls up to the pump and a screen displays "Hello Ms. Smith, mid-grade fuel and a car wash?" In some examples, the suggestions order can be audibly conveyed to the user.

In some examples, the user can confirm the suggested fuel grade and/or any suggested ancillary products and/or services. In some examples, the user select a different fuel grade and/or can decline or modify any suggested ancillary products and/or services.

As part of the first limited VRT, the computing device of the fueling station can provide transaction data to the VRT system (e.g., upon completion of the transaction). For example, after the user has pumped the fuel and paid and has received any purchased ancillary products and/or services, transaction data can be transmitted to VRT system. In some examples, the transaction data includes behavioral data and/or disbursement data. For example, the transaction data can include time, date, transaction type (e.g., fuel), contents of the order (e.g., fuel, ancillary products and/or services), and disbursement data (e.g., cash, credit, debit). In this manner, the transaction data can be recorded by the VRT system for use in subsequent VRTs.

In some examples, the response can indicate that a user is associated with the VID and that there is disbursement data associated with the user, but there is no behavioral data associated with the user. Consequently, a second limited VRT can be performed. In some examples, the second limited VRT includes receiving a fuel grade selection from the user, providing at least one suggested payment option to the user based on the disbursement data, and receiving payment from the user. In some examples, the disbursement data can indicate one or more methods of payment that the user can use based on the disbursement data, and the suggested payment option can be provided based thereon. For example, if the disbursement data indicates a credit card account, the suggested payment option can include the credit card account. For example, the user pulls up to the pump, selects a fuel grade, and the suggested payment options are conveyed to the user (e.g., on a display screen, audibly). In some examples, the user can confirm the suggested payment option. Consequently, the suggested payment option is executed to pay for the fuel and any ancillary products and/or services. In some examples, because the disbursement data is provided, payment can be tendered automatically without requiring further input from the user. For example, the user's credit card can be charged without the user having to actually tender the credit card. In some examples, the user declines the suggested payment option and pays using another method (e.g., paying in cash).

As part of the second limited VRT, the computing device of the fueling station can provide transaction data to the VRT system (e.g., upon completion of the transaction). For example, after the user has paid and has received the food, transaction data can be transmitted to VRT system. In some examples, the transaction data includes behavioral data and/or disbursement data. For example, the transaction data can include time, date, transaction type (e.g., fuel), contents of the order (e.g., fuel, any ancillary products and/or services), and disbursement data (e.g., cash, credit, debit). In this manner, the transaction data can be recorded by the VRT system for use in subsequent VRTs.

In some examples, the response can indicate that a user is associated with the VID and that there is both behavioral data and disbursement data associated with the user. Consequently, a full VRT can be performed. In some examples, the full VRT is a combination of the first and second limited VRTs. That is, the behavioral data is used to provide a suggested fuel grade and any suggested ancillary products and/or services to the user, and the disbursement data is used to provide a suggested payment option to the user. As part of the full VRT, the computing device of the fueling station can provide transaction data to the VRT system (e.g., upon completion of the transaction). For example, after the user has pumped the fuel, paid and has received any ancillary products and/or services, transaction data can be transmitted to VRT system. In some examples, the transaction data includes behavioral data and/or disbursement data. For example, the transaction data can include time, date, transaction type (e.g., fuel), contents of the order (e.g., fuel, any ancillary products and/or services), and disbursement data (e.g., cash, credit, debit). In this manner, the transaction data can be recorded by the VRT system for use in subsequent VRTs.

In accordance with implementations of the present disclosure, the VID can be used as one of multiple authentication factors to authenticate the user. More specifically, the VID can be used as a factor in a multi-factor authentication scheme. With reference to the example use case of retrieving cash from an ATM, the VID can be used to authenticate the user before the ATM enables the user to withdraw cash. In a traditional workflow of this example use case, the multi-factor authentication includes a card (e.g., bank card) and a personal identification number (PIN). That is, the user inserts the card into the ATM and inputs the PIN.

In accordance with implementations of the present disclosure, the VID replaces one of the card and the PIN as an authentication factor. In some examples, upon pulling up to an ATM in a vehicle, for example, equipment at the ATM can scan the vehicle to determine the VID of the vehicle. For example, the equipment can include a camera that can provide a digital image of the vehicle, the image can be processed using OCR to determine the VID (e.g., LPN, VIN). As another example, the equipment can include a RFID reader that can scan the vehicle and receive a RFID signal (e.g., from an RFID tag of the vehicle), which can be decoded to provide the VID. As another example, the equipment can include a receiver that receives a signal periodically transmitted from a transponder of the vehicle, the signal being decoded to provide the VID.

In some examples, a computing device of the ATM can transmit a request for authentication information. In some examples, the request includes the VID. In some examples, the request includes context information. Example context information can include, without limitation, date, time, location. The computing device can transmit the request to at least one entity (e.g., financial institution) that provides a VRT system. As another example, the computing device can transmit the request to a TSP that provides a VRT system. In some examples, the computing device receives a response (e.g., from an entity or a TSP). In some examples, the response can indicate that there are no users associated with the VID. Consequently, a VID-based authentication cannot be performed and the activities at the ATM are executed in a traditional workflow (e.g., user inserts card, inputs PIN, and performs transaction(s)). In some examples, the response can indicate that a user is associated with the VID, but there is not approval to use the VID as an authenticator. Consequently, a VID-based authentication cannot be performed and the activities at the ATM are executed in a traditional workflow (e.g., user inserts card, inputs PIN, and performs transaction(s)). In some examples, the response can indicate that the VID can be used to as an authentication factor. Consequently, a message can be displayed to the user instructing the user, for example, to either insert a card, or input a pin. In some examples, if the user inserts a card, authentication is performed based on data provided from the card and the VID. In some examples, if the user inputs a PIN, authentication is performed based on the PIN and the VID. In this manner, the user can conduct the transaction if, for example, the user forgot to bring the card, or cannot remember the PIN.

Implementations of the present disclosure enable information stored by the VRT system to be associated and disassociated with vehicles. For example, if the user purchases a new car, and would like to use the new car for VRTs, the user can inform the VRT system. For example, the user can submit their name, purchase information (e.g., date of purchase), and the VID of the vehicle to the VRT system. In some examples, the VRT system can cross-reference the user-provided information with information provided from a vehicle registration authority (VRA) (e.g., a Secretary of State and/or a Department of Transportation for a particular state). For example, if the user provides a VIN and/or LPN as the VID, the VRT system can transmit a request to a database provided by the VRA (e.g., over a network). The VRT system can receive a response from the database. In some examples, the response includes the VIN and/or LPN, as well as a name and address of the registered owner of the vehicle that is assigned the VIN and/or LPN. In some examples, the VRT system compares the name and address provided from the database of the VRA with a name and address provided from the user. In some examples, if one or both of the names and addresses match, the user-provided information is verified as accurate, and the VRT system can associate the VID with the user. In some examples, if one or both of the names and addresses do not match, the user-provided information is not verified as accurate, and the VRT system does not associate the VID with the user. In this manner, the VRT system can confirm the accuracy of the user-provided information.

In some implementations, if the user sells a vehicle, and would like to dis-associate their user information with the VID, the user can inform the VRT system. For example, the user can submit their name and the VID of the vehicle to the VRT system. In some examples, the user information can be dis-associated with the VID in response to the user's request. For example, the user can provide credentials (e.g., username, password) to the VRT system, and the VRT system can dis-associate the user information and VID, if the user is authenticated based on the credentials.

Figure 2:
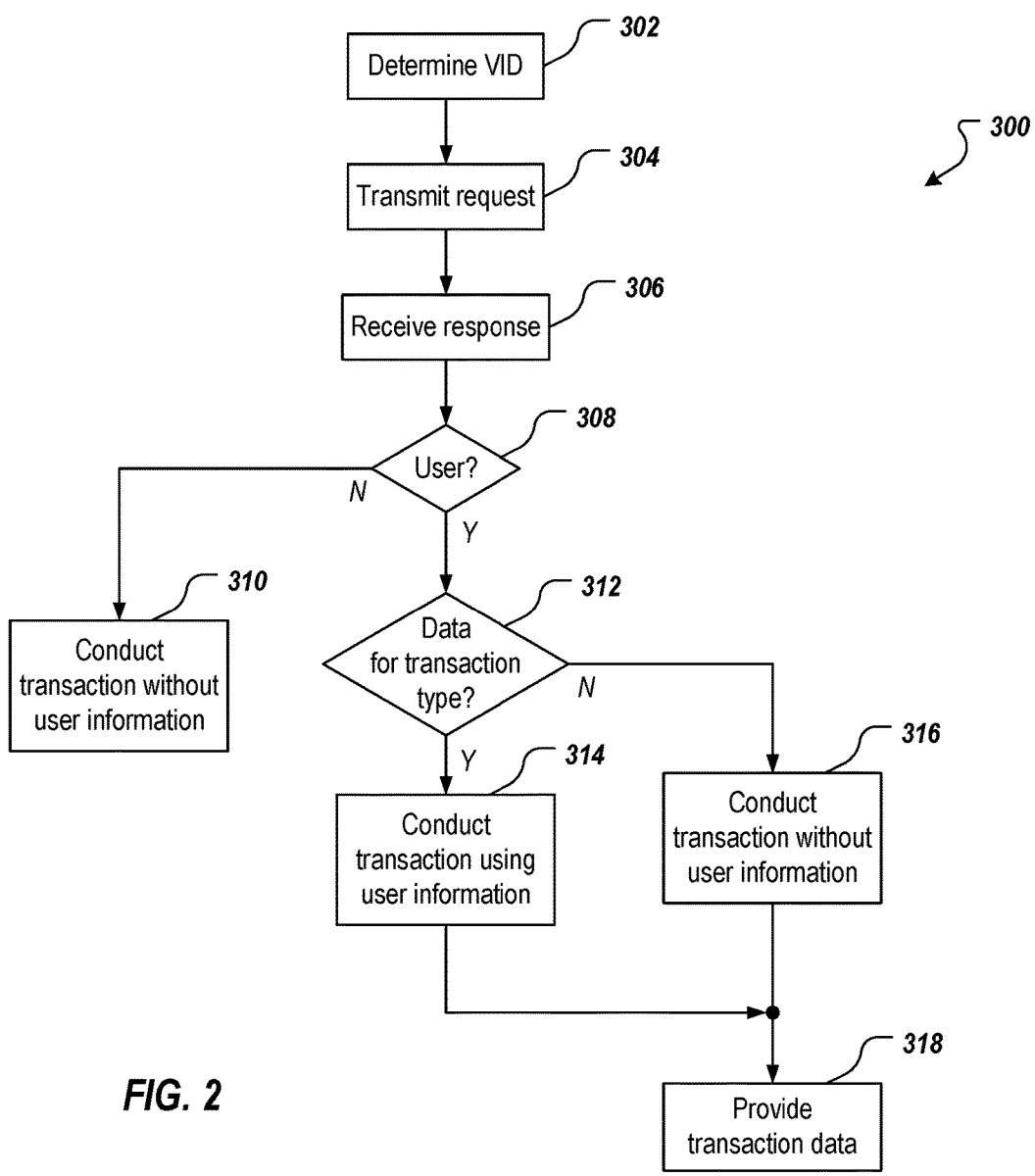
FIG. 2 depicts an example process that can be executed in accordance with implementations of the present disclosure.

FIG. 2 depicts an example process 300 that can be executed in accordance with implementations of the present disclosure. The example process 300 can be implemented, for example, by the example environment 100 of FIG. 1. In some examples, the example process 300 can be provided by one or more computer-executable programs executed using one or more computing devices. For example, the example process 300, or portions thereof, can be provided by one or more programs executed by one or more computing devices.

A VID of a vehicle is determined (302). In some examples, and as described herein, the VID can be determined using equipment (e.g., located at a restaurant, a fuel station, an ATM) that can scan the vehicle to determine the VID of the vehicle. For example, the equipment can include a camera that can provide a digital image of the vehicle, the image can be processed using OCR to determine the VID (e.g., LPN, VIN). As another example, the equipment can include a RFID reader that can scan the vehicle and receive a RFID signal (e.g., from an RFID tag of the vehicle), which can be decoded to provide the VID. As another example, the equipment can include a receiver that receives a signal periodically transmitted from a transponder of the vehicle, the signal being decoded to provide the VID. A request is transmitted (304). For example, a request is transmitted from a location (e.g., a restaurant, a fuel station, a fuel pump, an ATM) to a VRT system. In some examples, the request includes the VID. In some examples, the request includes context information.

A response is received (306). For example, the response is sent from the VRT system to the location (e.g., a restaurant, a fuel station, a fuel pump, an ATM). In some examples, the response can indicate whether there is at least one user associated with the VID. In some examples, the response can provide behavioral data and/or purchase data associated with at least one user. In some examples, the behavioral data and/or the purchase data are provided based on the context data. It is determined whether at least one user is associated with the VID (308). For example, computing equipment at the location can determine whether the response indicates at least one user associated with the VID. If at least one user is not associated with the VID, an operation is conducted without user information being provided (310). That is, for example, the transaction is conducted without user information that is provided from the VRT system. In some examples, the transaction is conducted in a traditional workflow based on the transaction type. For example, with regard to food ordering, a traditional workflow can include: user relays order to personnel at the restaurant, restaurant prepares order, user pays at drive-thru window). As another example, with regard to fueling a vehicle, a traditional workflow can include: user selects fuel type, fuels vehicle, tenders payment. As another example, with regard to using an ATM, a traditional workflow can include: user inserts card, inputs PIN, and performs transaction(s).

If at least one user is associated with the VID, it is determined whether user information is available for the transaction type (312). In some examples, it is determined whether behavioral information and/or disbursement information is provided. For example, computing equipment at the location can determine whether the response provides behavioral information and/or disbursement information. If user information is provided for the transaction type, the transaction is conducted using the user information (314). For example, the transaction can be conducted to provide a suggested order, if behavioral information is provided. As another example, the transaction can be conducted to provide a suggest payment method, if disbursement information is provided. Transaction data is provided (318). For example, upon completion of the transaction, transaction data can be provided from the location (e.g., a restaurant, a fuel station, an ATM) to the VRT system. In some examples, the transaction data includes behavioral information and/or disbursement information that is specific to the just executed transaction, and that can be integrated into the user information stored for the particular user by the VRT system. If user information is not provided for the transaction type, the transaction is conducted without user information (316). That is, for example, the transaction is conducted without user information that is provided from the VRT system. In some examples, the transaction is conducted in a traditional workflow based on the transaction type. For example, with regard to food ordering, a traditional workflow can include: user relays order to personnel at the restaurant, restaurant prepares order, user pays at drive-thru window). As another example, with regard to fueling a vehicle, a traditional workflow can include: user selects fuel type, fuels vehicle, tenders payment. As another example, with regard to using an ATM, a traditional workflow can include: user inserts card, inputs PIN, and performs transaction(s). Transaction data is provided (318).

Implementations of the present disclosure also enable VRTs to be conducted based on a VID with or without user information that is specific to an identified user. In some implementations, a VRT can be conducted based on a VID (e.g., LPN, VIN) and historical transaction data associated with the VID. In some examples, user information specific to a particular user can be subsequently associated when known. For example, a red Ford Mustang with a LPN (e.g., BY546x TX) and a VIN (e.g., XXXXX) drives through a fast food restaurant and places an order. The VID can be determined and details of the order can be associated with the VID as historical transaction data. Subsequently, (e.g., two days later), the same red Ford Mustang can pull into a fast food restaurant (e.g., the same chain, same location, or other location), and the historical transaction data from the earlier visit can be used to recommend one or more orders to the driver (e.g., display two orders previously ordered, and ask the driver if they would like to re-order one of the same). In this example, no user-specific user information (e.g., financial data) is required. In the case of a national chain, the driver could get the same order in any location that uses the VRT system.

As another example, a red Ford Mustang pulls into a pharmacy drive-through to drop-off an order for a prescription. During drop-off, the VID can be determined and details of the order can be associated with the VID as historical transaction data. In some examples, the person, for whom the prescription is being provided, can be associated with the VID in the VRT system. Subsequently, (e.g., an hour later), the same red Ford Mustang can return to the drive-thru to pick-up the prescription. The VID can be determined and the corresponding prescription can be identified, such that the prescription can be made available to the driver.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a data store for storing data; and
    at least one processor configured to interact with the data store, the at least one processor being further configured to execute computer-readable instructions to perform operations comprising:
        receiving, from scanning equipment located at an automated teller machine (ATM), a vehicle identifier (VID), the VID uniquely identifying a vehicle of a user;
        sending a request to a vehicle recognition based transaction (VRT) system, the request including the VID;
        receiving, from the VRT system, a response that indicates the user and that provides user information associated with the user, the user information comprising one or more of behavioral information and disbursement information;
        authenticating, by the ATM, the user based on the user information and an input provided by the user to the ATM; and
        in response to authenticating the user, performing an ATM transaction requested by the user.

2. The system of claim 1, wherein operations further comprise transmitting a request to a vehicle recognition based transaction (VRT) system, the request comprising the VID and context information, the response being provided from the VRT system based on the request.

3. The system of claim 2, wherein the context information comprises one or more of date, time, location, and operation type.

4. The system of claim 2, wherein the one or more of behavioral information and disbursement information are provided based on the context information.

5. The system of claim 1, wherein the user information indicates that the VID is approved as an ATM authentication factor for the user.

6. The system of claim 1, wherein the ATM transaction comprises withdrawing money.

7. The system of claim 1, wherein the input provided by the user comprises a user PIN, and
wherein authenticating the user comprises authenticating the user to perform the ATM transaction based on the VID and the PIN.

8. The system of claim 1, wherein the input provided by the user comprises a bank card, and
wherein authenticating the user comprises authenticating the user to perform the ATM transaction based on the VID and the bank card.

9. A computer implemented method executed by at least one processors, the method comprising:
receiving, from scanning equipment located at an automated teller machine (ATM), a vehicle identifier (VID), the VID uniquely identifying a vehicle of a user;
sending a request to a vehicle recognition based transaction (VRT) system, the request including the VID;
receiving, from the VRT system, a response that indicates the user and that provides user information associated with the user, the user information comprising one or more of behavioral information and disbursement information;
authenticating, by the ATM, the user based on the user information and an input provided by the user to the ATM; and
in response to authenticating the user, performing an ATM transaction requested by the user.

10. The method of claim 9, further comprising transmitting a request to a vehicle recognition based transaction (VRT) system, the request comprising the VID and context information, the response being provided from the VRT system based on the request.

11. The method of claim 10, wherein the context information comprises one or more of date, time, location, and operation type.

12. The method of claim 10, wherein the one or more of behavioral information and disbursement information are provided based on the context information.

13. The method of claim 9, wherein user information indicates that the VID is approved as an ATM authentication factor for the user.

14. The method of claim 9, wherein the ATM transaction comprises withdrawing money.

15. The method of claim 9, wherein the input provided by the user comprises a user PIN, and
wherein authenticating the user comprises authenticating the user to perform the ATM transaction based on the VID and the PIN.

16. The method of claim 9, wherein the input provided by the user comprises a bank card, and
wherein authenticating the user comprises authenticating the user to perform the ATM transaction based on the VID and the bank card.

17. An automated teller machine (ATM) comprising:
at least one processor;
vehicle identifier (VID) scanning equipment in communication with the at least one processor; and
at least one data store coupled to the at least one processor having instructions stored thereon which, when executed by the at least one processor, causes the at least one processor to perform operations comprising:
receiving, from the VID scanning equipment, a VID, the VID uniquely identifying a vehicle of a user;
sending a request to a vehicle recognition based transaction (VRT) system, the request including the VID;
receiving, from the VRT system, a response that indicates the user and that provides user information associated with the user, the user information comprising one or more of behavioral information and disbursement information;
authenticating, by the ATM, the user based on the user information and an input provided by the user to the ATM; and
in response to authenticating the user, performing an ATM transaction requested by the user.

18. The ATM of claim 17, wherein the input provided by the user comprises a user PIN, and
wherein authenticating the user comprises authenticating the user to perform the ATM transaction based on the VID and the PIN.

19. The ATM of claim 17, wherein the input provided by the user comprises a bank card, and
wherein authenticating the user comprises authenticating the user to perform the ATM transaction based on the VID and the bank card.

20. The ATM of claim 17, wherein the ATM transaction comprises withdrawing money.

* * * * *

UNITED STATES PATENT AND TRADEMARK OFFICE
CERTIFICATE OF CORRECTION

Page 1 of 1

PATENT NO. : 10,235,675 B1
APPLICATION NO. : 15/175795
DATED : March 19, 2019
INVENTOR(S) : Sharon Kay Haverlah It is certified that error appears in the above-identified patent and that said Letters Patent is hereby corrected as shown below:

On the Title Page

Column 1 (Assignee), delete "Assocation" and insert -- Association --, therefor.

Signed and Sealed this
Twenty-eighth Day of May, 2019

Andrei Iancu
*Director of the United States Patent and Trademark Office*